United States Patent [19]

Mehoudar et al.

[11] 4,307,841
[45] Dec. 29, 1981

[54] DRIP IRRIGATION SYSTEM

[75] Inventors: Raphael Mehoudar, Tel Aviv; Oded Winkler, Kibbutz Hatzerim, both of Israel

[73] Assignee: Hydro-Plan Engineering, Ltd., Tel Aviv, Israel

[21] Appl. No.: 97,440

[22] Filed: Nov. 26, 1979

Related U.S. Application Data

[63] Continuation of Ser. No. 962,632, Nov. 21, 1978, abandoned.

[30] Foreign Application Priority Data

Nov. 24, 1977 [IL] Israel .................................. 53463

[51] Int. Cl.³ ............................................. B05B 15/00
[52] U.S. Cl. ................................................... 239/542
[58] Field of Search ..................... 239/542, 533.1, 570, 239/571, 109, 547; 138/43, 45, 46; 251/120, 127

[56] References Cited

U.S. PATENT DOCUMENTS

| | | | |
|---|---|---|---|
| 3,870,236 | 3/1975 | Sahagun-Barragan | 239/542 |
| 3,882,892 | 5/1975 | Menzel | 239/542 |
| 3,979,070 | 9/1976 | Lemelshtrich | 239/542 |
| 3,981,452 | 9/1976 | Eckstein | 239/542 |
| 4,060,200 | 11/1977 | Mehoudar | 239/542 |

OTHER PUBLICATIONS

Naan Trickle Irrigation, "The Tube with the Built-In Dripper".

Primary Examiner—Johnny D. Cherry
Attorney, Agent, or Firm—Sandler & Greenblum

[57] ABSTRACT

A drip irrigation system comprising a thermoplastic conduit having substantially flat, discrete emitter units heat welded to axially spaced apart locations of an inner surface of the conduit adjacent outlet apertures formed in the conduit, the emitter units being preferably provided with an elastomeric membrane exposed to the throughflow pressure in the conduit for the purpose of stabilising the output rate of each emitter unit vis-a-vis possible flow pressure variations in the conduit.

17 Claims, 8 Drawing Figures

DRIP IRRIGATION SYSTEM

This is a continuation of application Ser. No. 962,632 filed Nov. 21, 1978, now abandoned.

The present invention relates to a drip irrigation system. Known drip irrigation systems comprise a conduit for conducting irrigation liquid and means associated with the conduit for ensuring a drip rate output at spaced apart intervals along the length of the conduit.

For this purpose it has been known to provide irrigation conduits with very restricted outlet apertures so as to ensure a drip rate output. These outlet apertures, being of necessity of restricted dimensions become rapidly blocked and this limits seriously the usefulness of such conduits. As an alternative there have been developed, especially in recent years, drip rate emitter units coupled to the conduit at spaced apart positions thereof, these emitter units being such that a portion of the water flowing through the conduit flows out through each emitter unit so as to emerge as a pressureless drip. Numerous proposals exist for the construction of such emitter units and their coupling to the conduit. Such known emitter units fall into two main categories, namely: (a) so-called "inline" emitter units which are coupled in series with the conduit and therefore involve the severing of the conduit at the points of coupling, and (b) so-called "branch" emitter units whch essentially branch off from the conduit and therefore project therefrom.

It will be realised that it is inherent in the use of inline emitter units that the conduit is formed of separate successive lengths coupled together by the emitter units. This construction puts an essential limit on the amount of pull that can be exerted on the conduit before separation of the constituent element thereof takes place. With the so-called branch emitter units the necessity to aperture the conduits so as to couple the emitter units thereto inevitably weakens the conduit. Furthermore, the projection of the emitter units from the conduit renders them susceptible to mechanical damage and to being detached from the conduit and renders it difficult to coil the conduit provided with such branch emitters.

It is an object of the present invention to provide a drip irrigation system in which the above referred to disadvantages are substantially overcome.

According to the present invention there is provided a drip irrigation system comprising a thermoplastic conduit for conducting irrigation liquid, outlet apertures formed in said conduit in an axially spaced relationship, a plurality of discrete, substantially flat emitter units, respectively heat welded to axially spaced apart locations of an inner surface of said conduit which locations respectively include said apertures, each emitter unit comprising a body member of a substantially rigid thermoplastic material which is heat sealable with respect to the conduit, said body member having a first portion thereof heat welded to one of said spaced apart inner surface locations in a juxtaposed relationship with an outlet aperture and having a second and opposite portion thereof with an elongated groove formed therein, a cover member juxtaposed with respect to said second portion and defining with said groove a flow restricting flowpath spaced and thermally shielded from said first portion, directed towards the interior of said conduit and located substantially in the flow direction of said conduit, emitter unit inlets serving respectively to effect communication between the conduit interior and the inlet portions of the flowpaths, and emitter unit outlets serving respectively to effect communication between adjacently formed outlet apertures of said conduit and the outlet portions of said flowpaths, and wherein said cover member is constituted by a resiliently flexible membrane formed of a natural or synthetic elastomeric material and displaceable toward and away from said flow restricting flowpath in accordance with flow pressure variations in said conduit so as to stabilise the output rate of said emitter unit with respect to said variations.

This system has been specially developed so as to be capable of production with the simultaneous extrusion of the conduit (or of a strip subsequently to be formed into a conduit) and the heat welding thereto of preformed emitter units.

Such a system in accordance with the present invention allows for the following advantages to be achieved.

By virtue of the fact that the flow restricting flowpath is spaced from and thermally shielded from the emitter unit first portion which is heat welded to the conduit, it is ensured that the heat welding does not result in the distortion or blockage of the flowpath and the reliability and accuracy of the emitter unit is therefore maintained. This also allows for the speedy extrusion of the conduit seeing that the flowpath is protected from the effects of the welding (it does not suffer distortion from the heat of the welding nor can molten plastic material reach it). In consequence no special step need be taken to protect the flowpath from the welding.

Since the emitter unit cover member is constituted by a flexible membrane formed of a natural or synthetic elastomeric material and whose displacement in accordance with the prevailing pressure in the conduit serves to introduce a flow resistance which varies in accordance with pressure variations in the conduit it is ensured that the emitter output rate is maintained substantially stable. This is rendered possible in view of the fact that the pressure regulating membrane is directly exposed to the pressure prevailing in the conduit.

The irrigation systems in accordance with the present invention are advantageous in that the outer surface of the conduits is relatively smooth allowing for easy coiling and uncoiling. Furthermore, no projecting emitter units exist which can be displaced or damaged. The fact that the conduits themselves do not consist of separate portions coupled together by in-line emitter units substantially avoids the danger of the conduit coming apart during use.

It has been previously proposed (U.S. Pat. No. 3,981,452) to provide an irrigation system wherein the conduit itself constitutes the outer sleeve of the system there being located within this conduit, at axially spaced apart intervals, inner tubular parts having peripheral helical grooves. As compared with the system in accordance with the present invention, this hitherto proposed system has the following distinct disadvantages:

(i) the flow restricting path, being defined directly between the outer conduit and the inner tubular part is subject to obstruction and distortion when the constituent parts of the system (namely the conduit and the tubular parts) are welded together;

(ii) by virtue of the fact that the inner tubular part is heat welded to the entire periphery of the surrounding conduit, the water pressure in and acting on the conduit tends to separate the conduit from the inner part. This is in contradistinction to the arrangement in accordance with a preferred embodiment of the present invention where the emitter unit extends in width over less than ⅓ of the periphery of the conduit and is heat welded to only a restricted peripheral portion of the inner conduit surface and so the effect of the water pressure in the conduit is to press the emitter unit to the conduit.

It has furthermore been previously proposed (U.S. Pat. No. 3,993,248) to provide an irrigation system wherein a conduit is provided with fluid flow regulators located within the conduit adjacent outflow apertures formed in the conduit. Each so-called "regulator" comprises a pair of flexible elements bonded to the conduit and projecting into the conduit for the major part of the width thereof. The region between the elements constitutes a flow restricting flowpath and the degree to which the elements are pressed together (which is a function of the water pressure in the conduit) determines the outflow rate of the water.

In accordance with this previous proposal both elements, serving on the one hand to provide the flow restricting flowpath and on the other hand to provide pressure control, are bonded to the conduit. This introduces conflicting requirements which cannot be satisfactorily achieved with a single material. This disadvantage does not exist with the system in accordance with the present invention seeing that pressure control is achieved using a membrane of an elastomeric material and this membrane is separately supported by the thermoplastic emitter unit body and it is only the latter which is to be heat welded to the conduit. Furthermore the emitter unit used in the system according to the present invention projects only minimally into the conduit (for less than ½ the conduit diameter) and therefore only affects minimally the flow in the conduit. This is in contradistinction to the arrangement shown in the previous proposal where the elements project into the major part of the width of the conduit. With the relatively shallow emitter unit used in the present invention, the flowpath is substantially in the direction of flow in the conduit and not normal thereto, as in the previous proposal. Thus relatively long shallow emitter units can be employed, the increased flowpath length thereof allowing for the use of relatively wide flowpaths which are not readily blocked. This is not the case with the previous proposal where the flowpath length is limited to the diameter of the conduit. As contrasted with the prior proposal the shallow emitter units in the system in accordance with the present invention do not interfere with the coiling of the conduit nor do they damage the thin walls of the conduit during coiling. Additionally the emitter units themselves are not subject to damage or distortion during coiling or for example when trodden upon during use, etc.

For a better understanding of the present invention and to show how the same may be carried out in practice, reference will now be made to the accompanying drawings in which.

Figure 1:
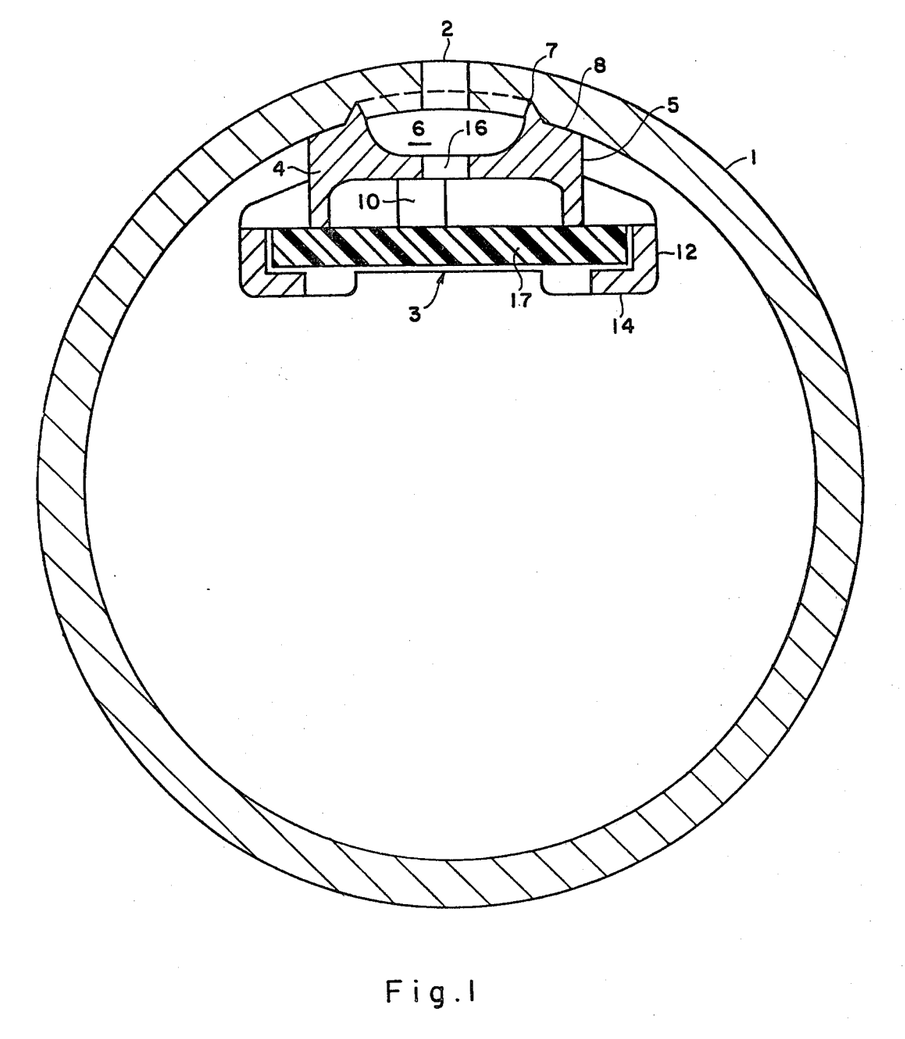
FIG. 1 is a cross-sectional view, on an enlarged scale, of a combined irrigation conduit and emitter unit constituting one form of drip irrigation system in accordance with the present invention.

As seen in FIG. 1 of the drawings a conduit 1 formed of a heat sealable thermoplastic material such as, e.g. polyethylene or the line is formed with axially spaced apart conduit outlet apertures 2. Heat welded to the inner surface of the conduit 1 at axially spaced apart locations (in which are respectively located the apertures 2) are emitter units 3.

Figure 2:
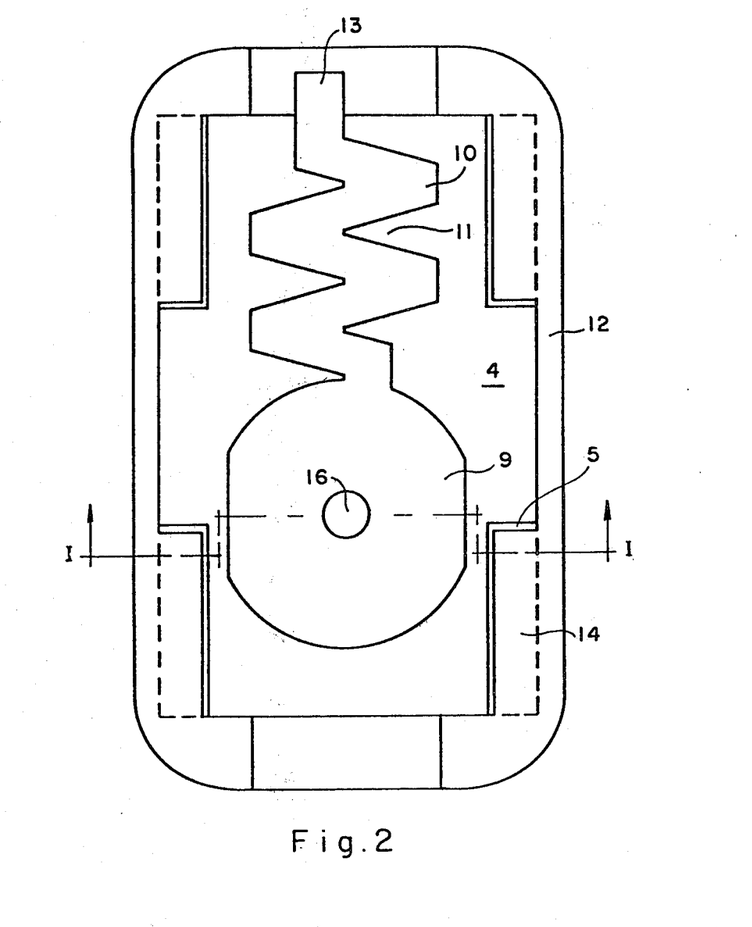
FIG. 2 is a plan view, from below, of the emitter unit shown in FIG. 1 with a cover member thereof removed.

As seen in FIGS. 1 and 2 of the drawings each emitter unit 3 comprises a relatively elongated shallow body having a transverse base 4 from which there extends (upwardly as shown in FIG. 1) an elongated peripheral wall 5 defining an elongated well 6 and terminating in a peripheral edge portion 7 which adjoin sloping shoulder portions 8.

Formed in the under surface of the base 4 is a substantially circular cavity-like recess 9 which communicates with one end of an elongated groove 10 formed with a pair of oppositely directed sets of flow resisting, substantially triangular baffles 11. Extending downwardly (as seen in FIG. 1) from the base 4 is a peripheral wall 12 in a transverse portion of which is formed an inlet recess 13 which communicates with an opposite end of the groove 10. Formed integrally with corner portions of the peripheral wall 12 are inwardly directed retaining flanges 14 spaced from the adjacent surface of the base 4 and juxtaposed with respect to molding core windows 15 formed in the base 4.

A throughgoing bore 16 extends through the base from a central position in the recess 9 so as to communicate with the well 6.

A rectangular, flexibly resilient rubber membrane 17 is retained by the flanges 14 and constitutes an emitter cover member which serves to define, with the elongated groove 10, a flow restricting flowpath. The recess 13 constitutes an emitter inlet whilst the bore 16 and well 6 constitute together an emitter outlet. It will be readily seen that the surface area of the cavity 9 is very substantially greater than the surface area of the mouth of the bore 16.

The emitter units 3 are heat welded at their peripheral edge portions 7 to the inner surface of the conduit 1 at axially spaced apart locations. This heat welding takes place during the extrusion process of the conduit when the conduit is still in a highly plastic condition. Subsequent to the heat welding the conduit is apertured so as to form the outlet apertures thereof.

It will be readily seen that the flow restricting flowpath, defined by the groove 10 and the membrane cover member 17, is spaced from and thermally shielded from the inner surface of the conduit and is therefore not subject to the possibly distorting influence or blockage arising out of the heat welding process. Furthermore, by virtue of the fact that the emitter outlet includes the relatively widely dimensioned well 6 it is ensured, on the one hand, that the heat welding process does not result in blockage of the relatively narrow outlet bore 16 and, on the other hand, the subsequent aperturing of the conduit can take place anywhere in the region of the conduit contiguous with the extended well 6 and this of course considerably simplifies the process of aperturing.

In use, and with the flow of irrigation liquid through the conduit, once the pressure build-up of the liquid in the conduit has reached a certain minimum level, the flexible membrane 17 is pressed against the rim of the groove 10 and of the cavity 9. Thus a portion of the irrigating water flowing through the conduit 1 passes through the flow restricting flowpath defined by the groove 10 and the flexible membrane 17 into the cavity 9 and out of the emitter via the bore 16 and well 6 so as to emerge from the conduit via the conduit outlet aperture 2 as a substantially pressureless drip. The cavity 9 defines, together with the membrane 17, an outlet control chamber and the provision of the resiliently flexible membrane 17 and its location between the outlet control chamber and the interior of the conduit ensures that the liquid pressure in the outlet control chamber is always a predetermined fixed amount below that prevailing in the conduit. Thus variations in the throughflow pressure in the conduit immediately gives rise to a displacement of the membrane so as to maintain the pressure differential constant and in this way it is ensured that the outflow rate from the emitter unit remains substantially invariant with respect to such pressure variations.

This maintenance of a substantially constant pressure differential with the pressure in the outlet control chamber (cavity 9) being less than the pressure in the conduit by a fixed predetermined amount (but being significantly greater than zero) carries with it the implication that the flow restricting flowpath is not required to effect pressure reduction down to zero. This considerably simplifies the constructional requirements for the flow restricting flowpath. Thus, in the example illustrated in FIGS. 1 and 2 a relatively short groove with relatively few triangular baffles is sufficient to reduce the flow pressure from that in the conduit (mains supply pressure) to that in the control chamber (e.g. 2½ meters). The subsequent reduction of pressure is achieved by the passage through the well 6 as restricted by the membrane 17 and the exit out of the aperture 2.

Figure 3:
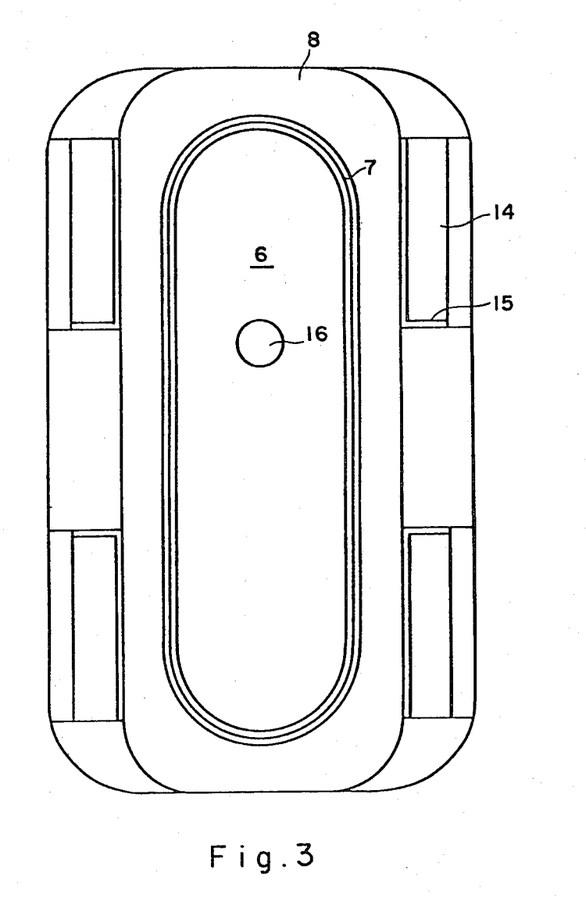
FIG. 3 is a plan view from above of the emitter unit shown in FIG. 1.
Figure 4:
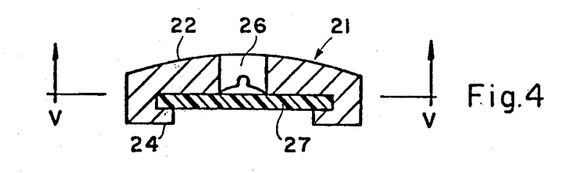
FIG. 4 is a cross-sectional view of a modified form of emitter unit for use in a drip irrigation system in accordance with the invention.
Figure 5:
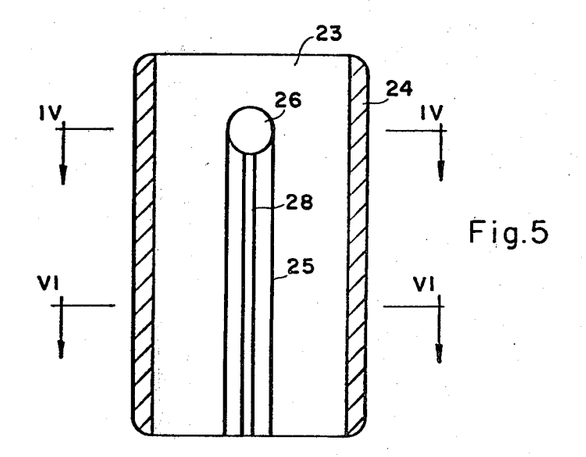
FIG. 5 is a longitudinally sectioned view taken along the line V—V of the emitter unit shown in FIG. 4.
Figure 6:
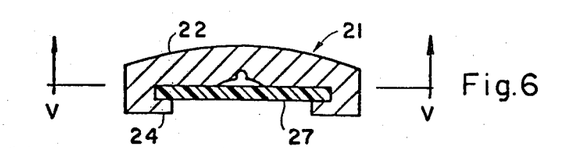
FIG. 6 is a cross-sectional view taken along the line VI—VI of the emitter unit shown in FIG. 5.

Whilst in the embodiment shown in FIGS. 1, 2 and 3 of the drawings pressure control is effected as a result of the maintenance of a fixed pressure differential between the interior of the conduit and an outlet control chamber, in the embodiments shown in FIGS. 4, 5 and 6 of the drawings pressure control is effected as a result of the narrowing or widening of the flow restricting flowpath by the flexible membrane.

As seen in FIGS. 4, 5 and 6 of the drawings, an emitter unit body 21 is formed with a first face 22 and an opposite, substantially planar second face 23 bounded by retaining flanges 24. Formed in the second face 23 is an elongated valley-like recess 25 extending from a first lateral edge of the emitter body to a throughgoing outlet bore 26 extending through the emitter body. An elongated groove 28 is formed in the base of the valley-like recess 25 extending from the first lateral edge of the emitter body to the throughgoing outlet aperture. A cover member constituted by a flat rectangular flexible membrane (formed of rubber) 27 is retained by the retaining flanges 24 and defines with the elongated groove 28 a flow restricting flowpath.

During the initial stages of pressure build-up and final stages of pressure die down a substantial flowpath exists between the membrane and the emitter body for the flush through of gathered impurities. During normal operation of the drip irrigation system however, the membrane 27 if pressed against the walls of the valley-like recess 25. Pressure regulation is achieved in view of the fact that, upon any undue rise of pressure in the conduit, the flexible membrane 27 is pressed into the groove 28 thereby restricting the through flowpath whereas upon a drop of pressure in the conduit the membrane moves slightly away thereby enlarging the through flowpath.

The location of the elongated groove 28 in the elongated recessed valley 25 ensures that, on the one hand, the membrane 27 is effectively pressed against the groove 28 during normal operation of the system thereby ensuring that water flow through the emitter is through the flow restricting flowpath. On the other hand, during the initial pressure buildup in the conduit, and also during the pressure die-down, when the supply is turned off, the membrane 27 is of course not pressed against the recessed valley 25 and, in this way, it is ensured that a relatively free large flow of irrigating water takes place between the membrane 27 and the emitter unit body and this is effective in flushing out impurities, etc. which may have accumulated in the outlet bore 26.

In the embodiments shown, the outlet wells of the emitters are of relatively significant dimensions and in this way it is ensured that, on the one hand, the outlet bores 16, 26 do not become blocked during the heat bonding of the emitters to the conduit and, on the other hand a relatively substantial area of the conduit is disposed opposite the emitter outlet well, in any position of which, the outlet aperture of the conduit can be formed thus facilitating the forming of the outlet apertures.

Figure 7:
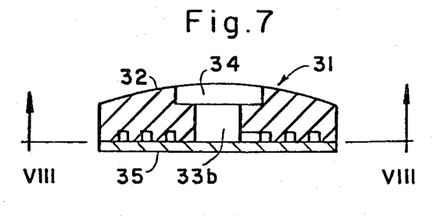
FIG. 7 is a cross-sectional view of a still further modification of an emitter unit for use in a drip irrigation system in accordance with the present invention.
Figure 8:
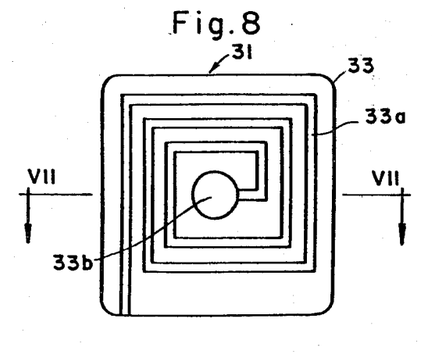
FIG. 8 is a cross-sectional view of the emitter unit shown in FIG. 7 taken along the line VIII—VIII.

The drip irrigation system in accordance with the present invention can also be useful with emitter units which are not provided with such pressure regulation means. Under these circumstances the cover member is formed of a relatively rigid element rather than of a flexible element. Such an emitter unit is shown in FIGS. 7 and 8 of the drawings. In this embodiment a flat, tablet-shaped emitter body 31 has a first face 32 and has formed on the opposite, substantially planar face 33, a labyrinthine groove which communicates at one end with a first lateral edge of the emitter unit body and at the other end with a central outlet aperture 33 which communicates with a central extended outlet recess 34 formed in the first face 32. A rigid cover member 35 is secured to the second face of the emitter unit body defining with the groove 33 a labyrinthine restricting flowpath. This emitter unit is heat-welded at its first face to the inner surface of the conduit as before.

The conduits can be formed of an elongated strip to which strip the emitter units are heat bonded when the strip is still in a highly plastic state after extrusion after which the strip can be bent over and heat welded at its longitudinal edges so as to form a conduit.

The emitter unit being substantially flat and relatively shallow is easily accommodated within the irrigation conduit and can therefore be relatively lengthy. This allows for the flow restricting flowpath to be relatively lengthy and therefore relatively wide. Such a wide flow restricting flowpath is, of course, not prone to blockage.

The very simple construction of the emitter unit which consists essentially of only two parts renders the emitter unit extremely cheap to produce and this is particularly the case when one bears in mind that one of the essential parts of the emitter unit, namely the cover member when formed of an elastomeric material can serve for pressure control. Thus, with such a two-part pressure regulated emitter unit the thermoplastic body part is available for heat bonding whilst the elastic membrane formed of a simple flat piece of rubber is extremely easy and cheap to produce as compared with other pressure regulating structures.

The emitter body itself can of course be readily produced by a simple two-piece mold.

Furthermore, the fact that the heat welding of the emitter unit to the conduit takes place during the actual extrusion of the conduit considerably simplifies the production of the system seeing that no separate production stage is required for this purpose.

Finally, the fact that the flow restricting flowpath is thermally shielded from the face of the emitter unit to be heat bonded means that the flowpath accuracy is not damaged during the heat bonding whilst, on the other hand, the fact that the resilient cover member membrane is directly exposed to the conduit facilitates the provision of ready pressure regulation.

The fact that the emitter units are all contained within the conduit and that the conduit surface is free of projections renders the system (the emitter unit itself and its coupling to the conduit) protected against external damage.

In one characteristic example of a drip irrigation system in accordance with the invention and as shown in FIGS. 1, 2 and 3 of the drawings, elements having the following characteristic dimensions are employed.

| Conduit | |
|---|---|
| External diameter | 16.5 mm |
| Wall thickness | 1.2 mm |
| Emitter unit | |
| Length | 15.5 mm |
| Width | 10.0 mm |
| Depth (projection into conduit) | 4.0 mm |
| Flowpath spacing | 0.85 mm |
| Outflow rate | 4 l/hour |
| Pressure control effective from | 5 meter |
| Membrane thickness | 0.5 mm |

The emitter width should not exceed ⅓ of the periphery of the conduit whilst the emitter depth should be such that the emitter does not project into the conduit for more than ½ the diameter thereof.

We claim:

1. A drip irrigation system comprising a thermoplastic conduit for conducting irrigation liquid, outlet apertures formed in said conduit in an axially spaced relationship, a plurality of discrete, substantially flat emitter units, respectively heat welded to axially spaced apart locations of an inner surface of said conduit which locations respectively include said apertures, each emitter unit comprising a body member of a substantially rigid thermoplastic material which is heat sealable with respect to the conduit, said body member having a first portion thereof heat welded to one of said spaced apart inner surface locations in a juxtaposed relationship with one of said outlet apertures and having a second and opposite portion thereof with an elongated groove formed therein, a cover member juxtaposed with respect to said second portion and defining with said groove a flow restricting flowpath spaced and thermally shielded from said first portion, said flowpath being directed towards the interior of said conduit and being located substantially in the flow direction of said conduit, emitter unit inlets serving respectively to effect communication between the conduit interior and the inlet portions of the flowpaths, and emitter unit outlets serving respectively to effect communications between adjacently formed outlet apertures of said conduit and the outlet portions of said flowpaths, and wherein said cover member is constituted by a resiliently flexible membrane formed of an elastomeric material and displaceable toward and away from said flow restricting flowpath in accordance with flow pressure variations in said conduit so as to stabilise the output rate of said emitter unit with respect to said variations.

2. A drip irrigation system according to claim 1 wherein said outlet portion of said flowpath includes a recessed cavity formed in said second portion of said unit and being of extended dimensions as compared with the width of said groove and wherein said unit outlet comprises an outlet bore formed in a base portion of said recessed cavity; said outlet bore having a rim area substantially less than that of said cavity, said cavity constituting an outlet control chamber.

3. A drip irrigation system according to claim 2 wherein said emitter unit body member comprises a transverse wall portion, a peripheral rim formed integrally with and extending from a first face of said wall portion and defining a well of extended dimensions as compared with said outlet aperture, said groove and cavity being formed in a second and opposite face of said wall portion.

4. A drip irrigation system according to claim 3 wherein there is furthermore provided a peripheral skirt extending from said second face and around said groove and cavity and formed integrally with a plurality of retaining flanges, said membrane being retained by said flanges so as to define with said groove and cavity said flowpath, said outlet bore extending through said wall portion.

5. A drip irrigation system according to claim 1 wherein said groove is formed in the base of an elongated recess formed in said second portion.

6. A drip irrigation system according to claim 1 wherein said unit outlet comprises a recessed well formed in said first portion and of extended dimensions as compared with said outlet aperture.

7. A drip irrigation system according to claim 1 wherein said flowpath includes a plurality of flow resisting baffles.

8. A drip irrigation system according to claim 1 wherein said unit outlet comprises a recessed well formed in said first portion and of extended dimensions as compared with said outlet aperture.

9. A drip irrigation system according to claim 1 wherein said emitter unit is welded to the inner surface of the conduit over an area which extends in width over less than ⅓ of the periphery of the conduit.

10. A drip irrigation system according to claim 1 wherein said emitter unit body member comprises a transverse wall portion, a peripheral rim formed integrally with and extending from a first face of said wall portion and defining a well of extended dimensions as compared with said outlet aperture, said groove being formed in a second and opposite face of said wall portion.

11. A drip irrigation system according to claim 10 wherein there is furthermore provided a peripheral skirt extending from said second face and around said groove and cavity and formed integrally with a plurality of retaining flanges, said membrane being retained by said flanges so as to define with said groove and cavity said flowpath, said outlet bore extending through said wall portion.

12. A drip irrigation system comprising a thermoplastic conduit for conducting irrigation liquid, outlet apertures formed in said conduit in an axially spaced relationship, a plurality of discrete emitter units, respectively heat welded to axially spaced apart locations of an inner surface of said conduit which locations respectively include said apertures, each emitter unit comprising a body member of a substantially rigid thermoplastic material which is heat sealable with respect to the conduit, said body member having a first portion thereof heat welded to one of said spaced apart inner surface locations in a juxtaposed relationship with one of said outlet apertures and having a second and opposite portion thereof with an elongated groove formed therein, a cover member juxtaposed with respect to said second portion and defining with said groove a flow restricting flowpath spaced and thermally shielded from said first portion, said flowpath being directed towards the interior of said conduit and being located substantially in the flow direction of said conduit, emitter unit inlets serving respectively to effect communication between the conduit interio and the inlet portions of the flowpaths, and emitter unit outlets serving respectively to effect communication between adjacently formed outlet apertures of said conduit and the outlet portions of said flowpaths.

13. A drip irrigation system according to claim 12 wherein said flowpath includes a plurality of flow resisting baffles.

14. A drip irrigation system according to claim 12 wherein said cover member is relatively rigid.

15. A drip irrigation system according to claim 12 wherein said unit outlet comprises a recessed well formed in said first portion and of extended dimensions as compared with said outlet aperture.

16. A drip irrigation system comprising a thermoplastic conduit for conducting irrigation liquid, outlet apertures formed in said conduit in an axially spaced relationship, a plurality of discrete, substantially flat emitter units, respectively heat welded to axially spaced apart locations of an inner surface of said conduit which locations respectively include said apertures, each emitter unit comprising a body member of a substantially rigid thermoplastic material which is heat sealable with respect to the conduit, said body member having a first portion thereof heat welded to one of said spaced apart inner surface locations in a juxtaposed relationship with one of said outlet apertures and having a second and opposite portion thereof with an elongated groove formed therein, a cover member juxtaposed with respect to said second portion and defining with said groove a flow restricting flowpath spaced and thermally shielded from said first portion, said flowpath being directed towards the interior of said conduit and being located substantially in the flow direction of said conduit, emitter unit inlets serving respectively to effect communication between the conduit interior and the inlet portions of the flowpaths, and emitter unit outlets serving respectively to effect communication between adjacently formed outlet apertures of said conduit and outlet portions of said flowpaths, said outlet portion of said flowpath including a recessed cavity formed in said second portion of said unit and being of extended dimensions as compared with the width of said groove and wherein said unit outlet comprises an outlet bore formed in a base portion of said recessed cavity, said outlet bore having a rim area substantially less than that of said cavity, said cavity constituting an outlet control chamber, and wherein said cover member is constituted by a resiliently flexible membrane formed of an elastomeric material and displaceable toward and away from said flow restricting flowpath in accordance with flow pressure variations in said conduit so as to stabilize the output rate of said emitter unit with respect to said variations, said emitter unit body member comprising a transverse wall portion, a peripheral rim formed integrally with and extending from a first face of said wall portion and defining a well of extended dimensions as compared with said outlet aperture, said groove and cavity being formed in a second and opposite face of said wall portion, a peripheral skirt extending from said second face and around said groove and cavity and formed integrally with a plurality of retaining flanges, and said membrane being retained by said flanges so as to define with said groove and cavity said flowpath, said outlet bore extending through said wall portion.

17. A drip irrigation system according to claim 16 wherein said body member is of substantially rectangular shape, said retaining flanges being located at the corners thereof.

* * * * *

UNITED STATES PATENT AND TRADEMARK OFFICE
CERTIFICATE OF CORRECTION

PATENT NO. : 4,307,841
DATED : December 29, 1981
INVENTOR(S) : Raphael MEHOUDAR

It is certified that error appears in the above—identified patent and that said Letters Patent is hereby corrected as shown below:

On the title page:
In the identification of the inventor, the name "Oded Winkler" should be deleted.

In the identification of the assignee, --and Netafim Mutzarei Hashkaya Betiftuf Bekibbutz Hatzerim,-- should be added.

Signed and Sealed this

Thirtieth Day of November 1982

[SEAL]

Attest:

GERALD J. MOSSINGHOFF

Attesting Officer

Commissioner of Patents and Trademarks